United States Patent
Saad et al.

(10) Patent No.: US 9,671,515 B2
(45) Date of Patent: Jun. 6, 2017

(54) VALVE BOX

(71) Applicant: SOCIETE PLYMOUTH FRANCAISE, Feyzin (FR)

(72) Inventors: Mounir Saad, Strasbourg (FR); Daniel Arnaud, Saint Etienne (FR)

(73) Assignee: SOCIETE PLYMOUTH FRANCAISE, Feyzin (FR)

( * ) Notice: Subject to any disclaimer, the term of this patent is extended or adjusted under 35 U.S.C. 154(b) by 93 days.

(21) Appl. No.: 14/359,273

(22) PCT Filed: Nov. 14, 2012

(86) PCT No.: PCT/FR2012/052631
§ 371 (c)(1),
(2) Date: May 19, 2014

(87) PCT Pub. No.: WO2013/072628
PCT Pub. Date: May 23, 2013

(65) Prior Publication Data
US 2014/0340087 A1    Nov. 20, 2014

(30) Foreign Application Priority Data

Nov. 18, 2011    (FR) ...................................... 11 60502

(51) Int. Cl.
*G01V 3/08*    (2006.01)
*E03B 9/04*    (2006.01)
(Continued)

(52) U.S. Cl.
CPC .................. *G01V 3/08* (2013.01); *E03B 9/04* (2013.01); *E03B 9/08* (2013.01); *F16L 1/11* (2013.01);
(Continued)

(58) Field of Classification Search
CPC ....... E03B 9/00–9/20; F16L 1/11; G01V 3/08; Y10T 137/5456–137/5468
(Continued)

(56) References Cited

U.S. PATENT DOCUMENTS 6,149,108 A * 11/2000 Weickenmeier ...... F16L 3/1203
                                                                 248/74.1
6,734,674 B1 * 5/2004 Struse ..................... G01M 3/18
                                                                 324/326
(Continued)

FOREIGN PATENT DOCUMENTS

DE            19725431 A1    5/1998
DE      102007025494 A1    12/2008
(Continued)

OTHER PUBLICATIONS

Pipe and Figttings, Iowaadot, http://www.iowadot.gov/erl/archives/oct_2008/US/content/5010.htm , 2008.*
(Continued)

*Primary Examiner* — Patrick Assouad
*Assistant Examiner* — Demetrius Pretlow
(74) *Attorney, Agent, or Firm* — Cantor Colburn LLP

(57) ABSTRACT

This hydrant (2) comprises an electrically conductive body (3) having a generally tubular shape and intended for being fixed in the floor flush with a valve mounted on a pipe, for example a water distribution pipe. The hydrant comprises connection means suitable for connecting at least one electrically conductive wire (10) extending along the pipe, said connection means being connected to the body (3) such that electric continuity is maintained between the body (3) and each electrically conductive wire (10) during use.

11 Claims, 3 Drawing Sheets

(51) Int. Cl.
  *E03B 9/08* (2006.01)
  *F16L 1/11* (2006.01)
  *H01R 4/48* (2006.01)
(52) U.S. Cl.
  CPC ...... *H01R 4/4818* (2013.01); *Y10T 137/5456* (2015.04)
(58) Field of Classification Search
  USPC .................................................. 324/326–329
  See application file for complete search history.

(56) References Cited

U.S. PATENT DOCUMENTS

| | | | |
|---|---|---|---|
| 6,868,860 B2 * | 3/2005 | Davidson | E03B 9/16 137/272 |
| 8,264,226 B1 * | 9/2012 | Olsson | G01V 3/15 324/326 |
| 2003/0094298 A1 | 5/2003 | Morrow et al. | |
| 2003/0189427 A1 * | 10/2003 | Oristaglio | G01V 3/15 324/326 |
| 2007/0075162 A1 | 4/2007 | McKeague | |
| 2009/0233495 A1 * | 9/2009 | Sproesser | H01R 11/282 439/754 |

FOREIGN PATENT DOCUMENTS

| | | |
|---|---|---|
| DE | 102009019984 A1 | 11/2010 |
| FR | 2776135 A1 | 9/1999 |
| FR | 2809495 A1 | 11/2001 |

OTHER PUBLICATIONS

International Search Report issued Jan. 16, 2013 re: PCT/FR2012/052631; citing: DE 10 2009 019984 A1, FR 2 776 135 A1, US 2003/094298 A1, DE 197 25 431 A1, DE 10 2007 025494 A1, FR 2 809 495 and US 2007/075162 A1.

* cited by examiner

VALVE BOX

TECHNICAL FIELD

The present invention relates to a valve box, and a method for detecting a buried pipe using a valve box.

BACKGROUND

A valve box is a device intended to be located at ground level so as to allow the access, using an appropriate key, to the operating member of a valve of a buried pipe, such as a water distribution pipe.

It is important for saving time and costs, but also for improved safety, to be able to detect the presence of such a pipe, and to localize it accurately, without digging the ground, nor destroying building, on the occasion of the subsequent works.

Several methods can be used to perform the detection of buried pipes.

The detection via an electromagnetic channel is the most commonly used method. This electromagnetic detection can be performed using electromagnetic detectors based on the active detection of an electromagnetic signal.

A first known method of active detection comprises injecting, using a current generator, an electrical signal in an electrically conductive wire associated with the pipe to be identified and disposed following the line of the latter, and this via connection casings installed at regular intervals along the pipe to serve as access points, and of using an electromagnetic detector arranged to detect an electromagnetic field created by an alternating current flowing in the electrically conductive wire.

Such a detection method proves to be expensive since it requires the installation of a large number of connection casings along the pipe to be detected, each casing being for example disposed either within a technical gallery, or on a non-buried terminal.

Moreover, such a method is not much suitable for the detection of water distribution pipes, since it is difficult to install the connection casings in the vicinity of water systems.

A second known method of active detection comprises injecting, using a current generator, an electrical signal directly in the pipe to be identified when the latter is electrically conductive.

Such a detection method is not suitable for the detection of water pipes, since a large part of the water pipes used are not electrically conductive on the one hand, and the water pipes are mostly inaccessible from the surface on the other hand. Moreover, in the case of cast-iron water pipes, each pipe includes individual elements connected together by elastomeric seals. Thus, an electrical signal injected into the water pipe could not propagate beyond the first elastomer seal, and therefore would make the water pipe monitoring impossible.

BRIEF SUMMARY

The present invention aims to overcome these drawbacks.

The technical problem underlying the invention is therefore of providing a valve box which is of simple and economical structure, and which allows an easy and rapid detection of a buried pipe, such as a water distribution pipe.

To this end, the present invention relates to a valve box including an electrically conductive body having a generally tubular shape and intended to be fixed in the ground plumb with a valve mounted on a pipe, for example a water distribution one, the valve box being characterized in that it includes connection means intended to connect at least one electrically conductive wire extending along the pipe, the connection means being connected to the body so as to maintain, in operating conditions, electrical continuity between the body and each electrically conductive wire.

The structure of the valve box according to the invention allows to inject an electrical signal in an electrically conductive wire associated with a pipe simply by connecting a current generator directly to the body of the valve box. The result is an easy localization of the pipe associated with the electrically conductive wire by using an electromagnetic detector arranged to detect the electromagnetic field created by the alternating current flowing in the electrically conductive wire.

Moreover, the localization of a pipe using a valve box according to the invention is economical, since it does not require the installation of a large number of connection casings in addition to the installation of the valve boxes.

Advantageously, the valve box is intended to be located at ground level.

Preferably, the valve box is arranged to allow the access to the operating member of the valve mounted on the pipe. In particular, the electrically conductive body is intended for the passage of an actuation key of the operating member of the valve mounted on the pipe. Advantageously, the electrically conductive body includes a tubular part intended for the passage of said actuation key.

It should be noted that each electrically conductive wire is grounded through the body of the valve box.

According to one embodiment of the invention, the connection means are mounted on the body so as to maintain, in operating conditions, an electrical continuity between the body and each electrically conductive wire.

Preferably, the connection means are electrically conductive.

Preferably, the body delimits at least one housing in which the connection means are housed. According to one embodiment of the invention, the body delimits two housings, for example radially opposite to one another.

The or each housing opens for example outwardly of the body, and preferably, substantially radially outwardly of the body.

Advantageously, the body includes a base delimiting at least partially the or each housing. The base forms, for example, the lower wall of each housing.

Each housing is preferably delimited by an upper wall extending substantially in parallel to the base, two side walls extending substantially perpendicular to the upper wall, and a lower wall formed by the base. The upper and side walls delimiting each housing, each preferably extending from a tubular part of the body.

According to one embodiment of the invention, the body includes a tubular part and a peripheral flange extending substantially radially from the lower edge of the tubular part, the peripheral flange forming the base.

Preferably, the base includes at least one passage opening into the or each housing and intended for the passage of an electrically conducting wire. According to one embodiment of the invention, the base includes two passage openings opening into each housing.

Advantageously, the connection means include at least one electrically conductive connection member to which at least one electrically conductive wire is intended to be connected, and preferably two electrically conductive wires.

The connection member comprises for example at least one support part and at least one clamping part intended to clamp the corresponding electrically conductive wire against the support part. Each clamping part is advantageously formed by an elastically deformable clamping tongue. These arrangements allow a rapid fixing of an electrically conductive wire, and this without requiring the use of a tool.

The connection member may be made with the same material as the core of an electrically conductive wire, preferably with stainless steel, for example with the 304L type stainless steel. The connection member is preferably in one piece, and for example made by stamping.

According to one embodiment of the invention, the connection member includes a substantially planar support part, and a stirrup-shaped part extending over the support part, ends of which are integral with the support part.

According to one embodiment of the invention, the connection means include two electrically conductive connection members. According to this embodiment, each connection member is preferably mounted in a different housing delimited by the body.

Preferably, the valve box comprises at least one protective casing made of an electrically nonconductive material in which the connection means are mounted. The protective casing is preferably housed in the or one of the housing(s) delimited by the body. The protective casing is for example shaped to close at least partially the corresponding housing.

According to one embodiment of the invention, the protective casing comprises immobilization means arranged to immobilize the connection means. The immobilization means include, for example, two immobilization ribs arranged to press the connection means against the protective casing.

According to one embodiment of the invention, the protective casing is supported against the upper face of the base.

The protective casing is for example made of plastic, and may be translucent so as to allow an operator to check the connection of an electrically conductive wire to the connection means.

The protective casing preferably includes at least one passage opening intended for the passage of an electrically conductive wire.

According to one embodiment of the invention, the valve box comprises fixing means arranged to fix the connection means on the body. The fixing means are preferably also arranged to fix the protective casing housing the connection means on the body. The fixing means are preferably electrically conductive so as to ensure electrical continuity between the connection means and the body. The fixing means include for example at least one electrically conductive fixing member, such as a fixing screw.

According to another embodiment of the invention, the fixing means are arranged to fix by magnetization the connection means on the body.

The body is preferably made of metal, for example made of cast-iron.

The present invention also relates to an installation comprising a valve box according to the invention, and at least one electrically conductive wire connected to the connection means and extending at least partially along a pipe, for example a water distribution pipe.

The present invention further relates to a detection method of a buried pipe, for example a water distribution pipe, comprising the steps of:

providing a valve box including an electrically conductive body having a generally tubular shape, fixing the body of the valve box in the ground plumb with a valve mounted on the pipe to be detected.

electrically connecting to the body of the valve box at least one electrically conductive wire intended to extend at least partially along the pipe, injecting an electrical signal in the body of the valve box, and detecting the electromagnetic field generated by the at least one electrically conductive wire.

The step of injecting an electrical signal is preferably carried out using a current generator. The detection step is advantageously carried out using an electromagnetic detector.

BRIEF DESCRIPTION OF THE DRAWINGS

In any case the invention will be understood from the following description with reference to the accompanying schematic drawing representing, as non-limiting example, an embodiment of this valve box.

DETAILED DESCRIPTION

Figure 1:
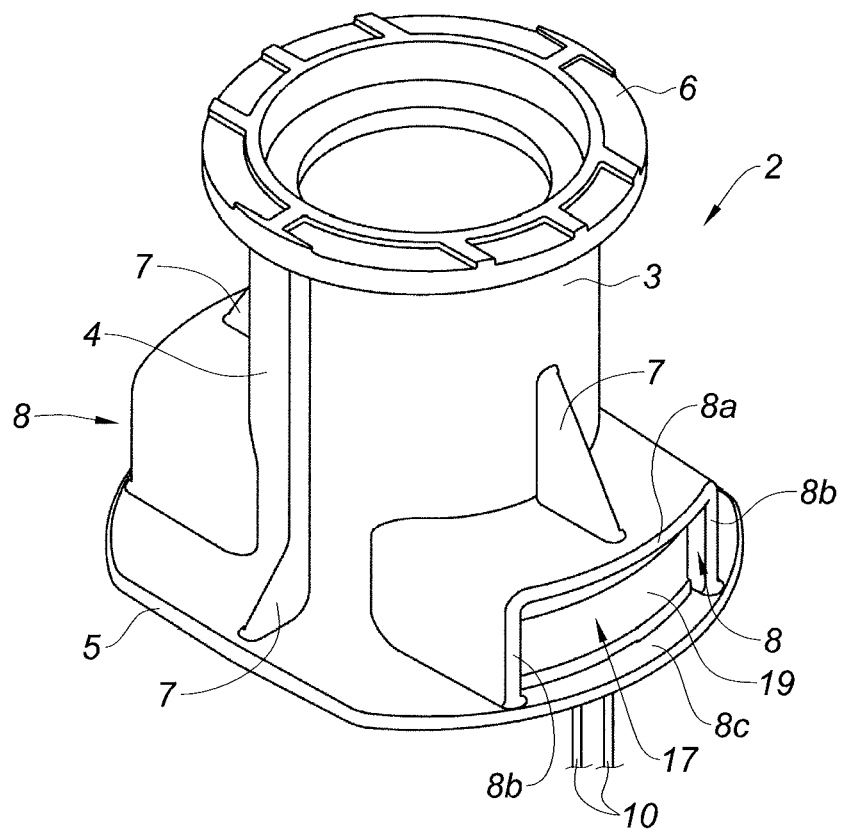
FIG. 1 is a perspective view of a valve box according to the invention.

FIGS. 1 to 4 represent a valve box 2 intended to be located at ground level so as to allow access, using a suitable key, to the operating member of a valve of a buried pipe, such as a water distribution pipe.

The valve box 2 includes a metal body 3, preferably made of cast-iron, having a generally tubular shape. The body 3 comprises a tubular part 4, a base 5 formed by a lower peripheral flange extending radially from the lower edge of the tubular part 4, and an upper peripheral flange 6 extending radially from the upper edge of the tubular part 4. The upper peripheral flange 6 is intended to receive a closing buffer (not shown in the figures) and to be located at the level of the roadway. The tubular part 4 is intended for the passage of an actuating key of the operating member of the corresponding valve.

The body 3 comprises longitudinal wings 7 intended to rotationally immobilize the body 3 in cooperation with the ground. The longitudinal wings 7 are regularly distributed over the periphery of the tubular part 4.

The body 3 delimits two housings 8 radially opposite to one another. Each housing 8 opens radially outwardly of the body 3. Each housing 8 is delimited by an upper wall 8a substantially extending in parallel to the base 5, two side walls 8b substantially extending perpendicular to the upper wall 8a, and a lower wall 8c formed by the base 5. The upper and side walls 8a, 8b delimiting each housing 8 each extending from the tubular part 4 of the body 3.

Figure 2:
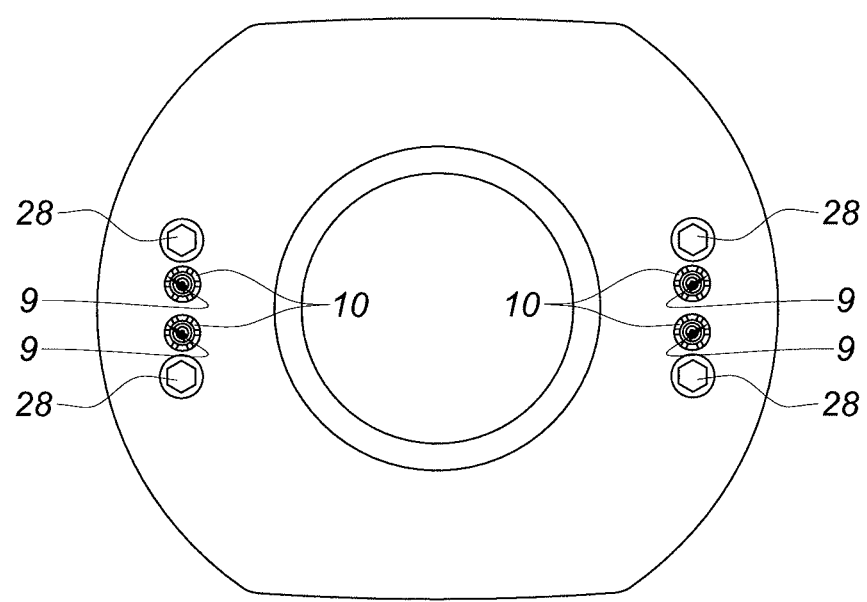
FIG. 2 is a bottom view of the valve box of the FIG. 1.

As shown in FIG. 2, the base 5 comprises a first pair of passage openings 9 opening into one of the housings 8 and a second pair of passage openings 9 opening into the other housing 8. Each passage opening 9 is adapted to the passage of an electrically conductive wire 10 extending along the pipe.

Figure 3:
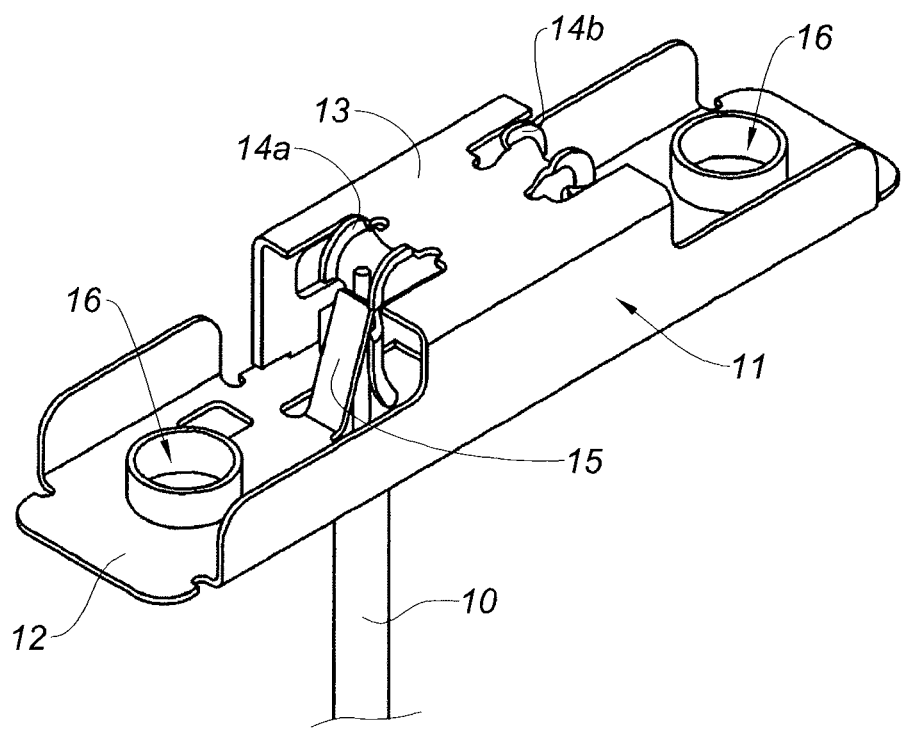
FIG. 3 is a perspective view of a connection member of the valve box of FIG. 1.

As shown more particularly in FIG. 3, the valve box 2 includes an electrically conductive connection member 11 intended to connect two electrically conductive wires 10. The connection member 11 is advantageously in one piece, and for example made by stamping. The connection member 11 is preferably made with the same material as the core of each electrically conductive wire 10, and for example with stainless steel, such as the 304L type stainless steel.

The connection member 11 includes a substantially planar support part 12 of rectangular shape, and a stirrup-shaped folded part 13 extending over the support part 12, free end of which is fixed on the support part 12.

The connection member 11 comprises a first support part 14a extending from a first side edge of the folded part 13 and a second support part 14b extending from a second side edge of the folded part 13. The first and second support parts 14a, 14b each extending in the direction of the support part 12 and each having preferably a concave section.

The connection member 11 comprises a first clamping tongue 15 elastically deformable extending from the support part 12 and intended to clamp a first electrically conductive wire 10 against the first support part 14a, and a second clamping tongue (not shown in the figures) elastically deformable extending from the support part 12 and intended to clamp a second electrically conductive wire 10 against the second support part 14b. Each of the first and second clamping tongues 15 is more particularly intended to clamp the core of the respective electrically conductive wire 10.

The connection member 11 further comprises two passage openings 16 arranged on the support part 12 and adapted to allow its fixing on the body 3, as will be explained hereinafter.

The valve box 2 also comprises a protective casing 17 made of an electrically non conductive material, for example of plastic. The protective casing 17 may be translucent, for example.

The protective casing 17 is composed of a fixing base 18 that ensures the positioning and the fixing of the connection member 11, and of a protective cover 19 intended to be mounted, for example by snap-fitting, on the fixing base 18.

Figure 4:
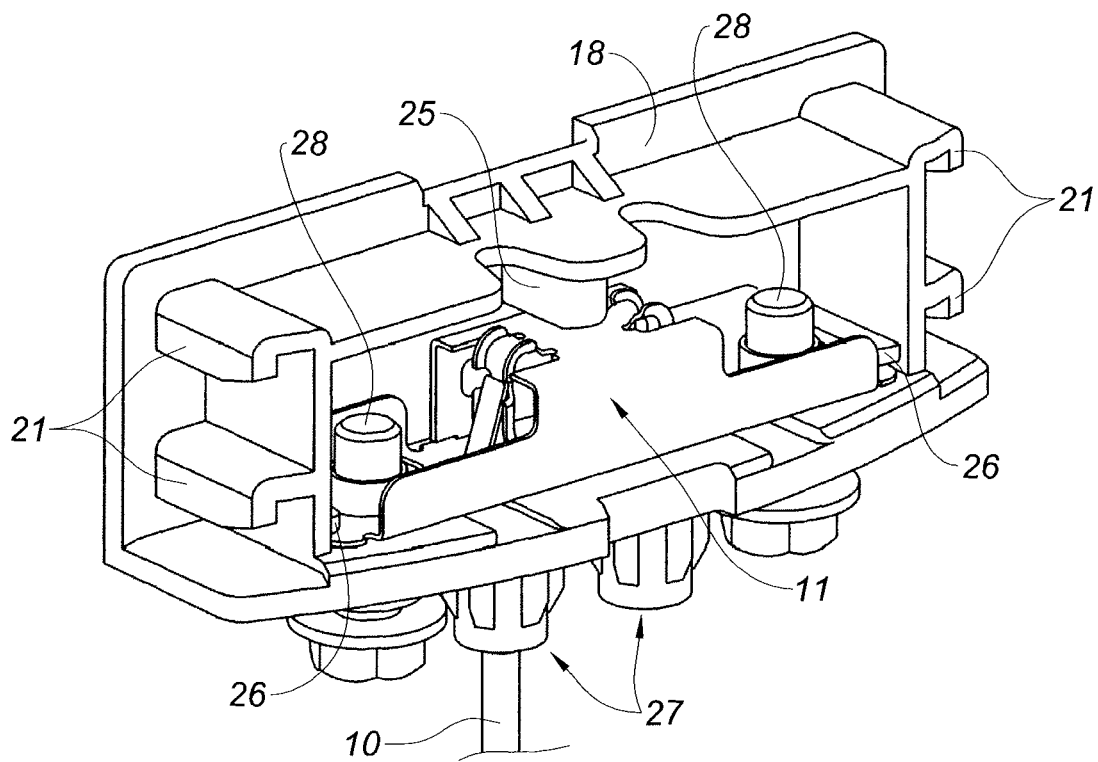
FIG. 4 is a perspective view of the connection member of FIG. 3 mounted in a protective casing.
Figure 6:
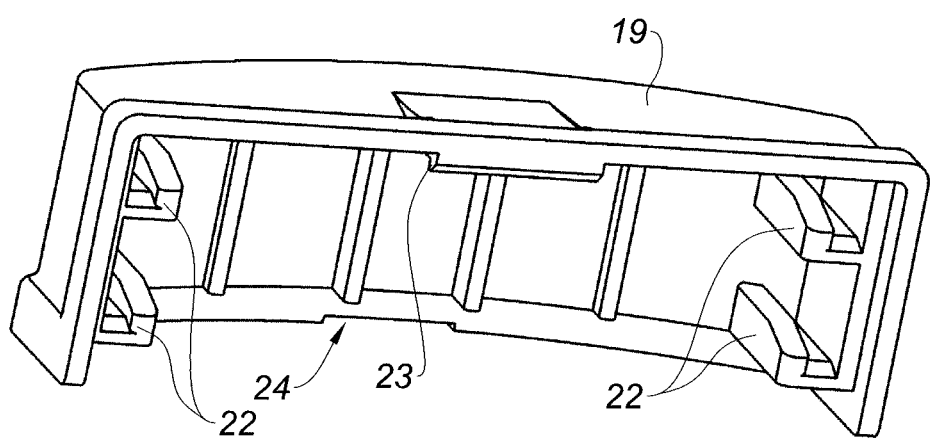
FIG. 6 is a perspective rear view of a protective cover belonging to the valve box of FIG. 1.

As shown in FIGS. 4 and 6, the fixing base 18 comprises two pairs of side hooks 21 facing downwards, and the protective cover 19 comprises two pairs of side hooks 22 facing upwards, the hooks 21 being arranged to cooperate with the hooks 22. The protective cover 19 further comprises a locking tongue 23 arranged to cooperate with the fixing base 18 so as to fix the protective cover on the fixing base. The protective cover 19 includes a notch 24 arranged in the lower edge of the protective cover and intended to receive a tool such as a screwdriver. These arrangements allow to raise the protective cover using a tool inserted into the notch 24 in order to disengage the locking tongue 23 and allow a removal of the protective cover 19.

The fixing base 18 comprises an immobilization boss 25 and two immobilization ribs 26 arranged to immobilize the connection member 11, and more particularly to press the support part 12 against the lower wall of the fixing base 18. The immobilization boss 25 is particularly arranged to cooperate with the folded part 13, while the immobilization ribs 22 are more particularly arranged to cooperate with the end parts of the support part 12.

As shown in FIG. 4, the fixing base 18 also includes two passage openings 27 each adapted for the passage of an electrically conductive wire 10.

Figure 5:
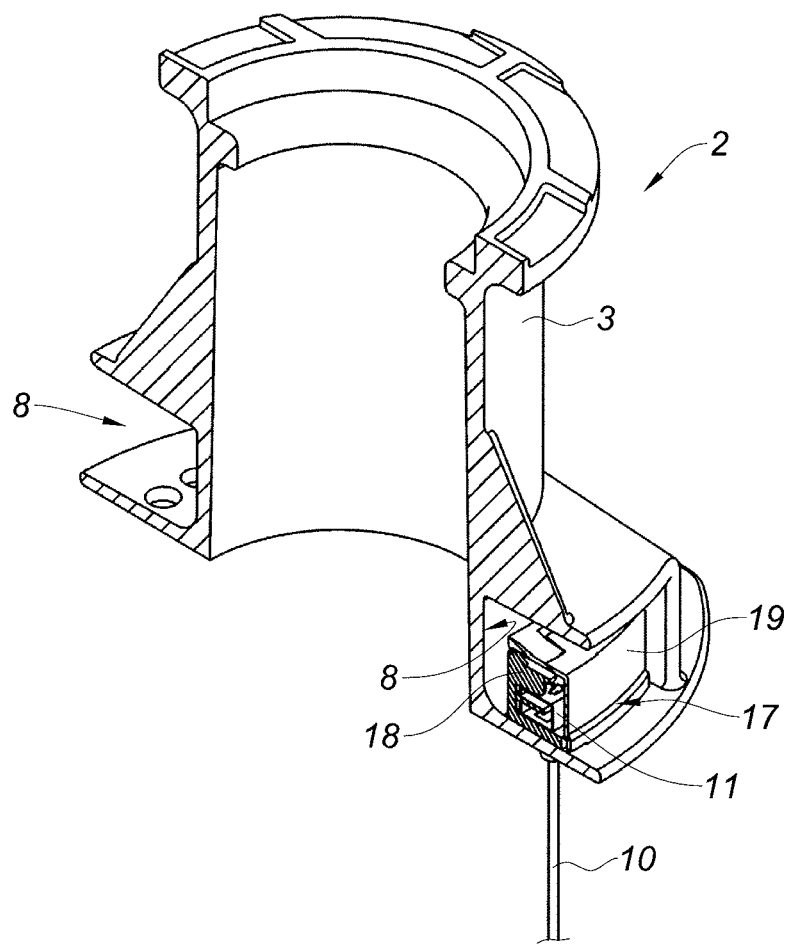
FIG. 5 is a perspective sectional view of the valve box of FIG. 1.

As shown respectively in FIGS. 1 and 5, the connection member 11 is mounted in the protective casing 17, and these are housed in one of the housings 8 delimited by the body 3. The protective casing 17 is supported against the upper face of the base 5. As shown in FIGS. 1 and 5, the protective cover 19 is shaped to partially close the housing 8.

The valve box 2 further comprises two fixing screws 28 arranged to fix the connection member 11 on the body 3, and more particularly on the base 5 of the body 3. The fixing screws 28 are made of metal so as to ensure an electrical continuity between the connection member 11 and the body 3. Thus, in operating conditions, the connection member 11 ensures an electrical continuity between the body 3 and each electrically conductive wire 10.

Each fixing screw 28 comprises a head supported against the lower face of the base 5, and a screw body extending successively through a passage opening arranged in the base 5, a passage opening arranged in the fixing base 18, and one of the passage openings 16 arranged in the connecting member 11.

According to one embodiment of the invention shown in FIG. 2, the valve box 2 includes two connection members 11, each mounted in a protective casing 17 and each housed in one of the housings 8, each fixing member 11 being fixed to the base 5 by means of two fixing screws 28 and being adapted for the connection of two electrically conductive wires 10.

A detection method of a buried pipe, for example a water distribution one, using a valve box according to the invention will now be described.

This method comprises the steps of:
providing a valve box 2 according to the invention,
fixing the body 3 of the valve box in the ground plumb with a valve mounted on the pipe to be detected,
stripping one of the ends of an electrically conductive wire 10,
connecting the stripped end of the electrically conductive wire 10 on the connection member 11,
injecting an electrical signal into the body 3 of the valve box 2 using a current generator, and
detecting the electromagnetic field generated by the electrically conductive wire 10 using an electromagnetic detector.

As is obvious, the invention is not limited to the sole embodiment of this valve box, described above as an example, on the contrary, it rather encompasses all the variants of embodiment.

The invention claimed is:

1. A valve box including an electrically conductive body having a generally tubular shape and intended to be fixed in the ground, and connection means intended to connect at least one electrically conductive wire extending at least partially along a pipe, the connection means being connected to the electrically conductive body so as to maintain, in operating conditions, an electrical continuity between the electrically conductive body and the at least one electrically conductive wire, wherein the connection means includes at least one electrically conductive connection member to which at least one electrically conductive wire is intended to be connected, and the connection member includes at least one support part and at least one clamping part intended to clamp the at least one electrically conductive wire against the support part, the electrically conductive body includes a tubular passage part configured for the passage of a valve actuation key.

2. The valve box according to claim 1, wherein the connection means are mounted on the electrically conductive body so as to maintain, in operating conditions, an electrical continuity between the electrically conductive body and the at least one electrically conductive wire.

3. The valve box according to claim 1, wherein the electrically conductive body delimits at least one housing in which the connection means are housed.

4. The valve box according to claim 3, wherein the electrically conductive body includes a base delimiting at least partially the housing.

5. The valve box according to claim 4, wherein the base includes at least one passage opening into the housing and intended for the passage of an electrically conductive wire.

6. The valve box according to claim 1, wherein the clamping part is formed by an elastically deformable clamping tongue.

7. The valve box according to claim 1, which comprises at least one protective casing made of an electrically non conductive material in which the connection means are mounted.

8. The valve box according to claim 1, which comprises fixing means arranged to fix the connection means on the electrically conductive body.

9. The valve box according to claim 8, wherein the fixing means are electrically conductive so as to ensure an electrical continuity between the connection means and the electrically conductive body.

10. An installation comprising a valve box according to claim 1, and at least one electrically conductive wire connected to the connection means and extending at least partially along a pipe.

11. A detection method of a buried pipe, comprising:
providing a valve box including an electrically conductive body having a generally tubular shape,
fixing the electrically conductive body of the valve box in the ground,
electrically connecting to the electrically conductive body of the valve box at least one electrically conductive wire intended to extend at least partially along the pipe, wherein a connection member includes at least one support part and at least one clamping part configured to clamp the at least one electrically conductive wire against the support part,
injecting an electrical signal in the electrically conductive body of the valve box, and
detecting the electromagnetic field generated by the at least one electrically conductive wire.

\* \* \* \* \*